US005323477A

United States Patent [19]

Lebby et al.

[11] Patent Number: 5,323,477

[45] Date of Patent: Jun. 21, 1994

[54] CONTACT ARRAY IMAGER WITH INTEGRAL WAVEGUIDE AND ELECTRONICS

[75] Inventors: Michael S. Lebby, Apache Junction; Karen E. Jachimowicz, Goodyear, both of Ariz.

[73] Assignee: Motorola, Inc., Schaumburg, Ill.

[21] Appl. No.: 933,544

[22] Filed: Aug. 24, 1992

[51] Int. Cl.$^5$ .......................... G02B 6/12; G02B 6/10

[52] U.S. Cl. ...................................... 385/129; 385/37; 385/14; 385/131; 385/133; 385/146; 385/901; 359/459; 359/802; 359/803

[58] Field of Search ...................... 385/37, 14, 33, 35, 385/129, 130, 131, 132, 133, 146, 147, 901, 902; 382/65, 69; 359/13, 15, 402, 403, 443, 449, 459, 460, 630, 802, 800, 801; 40/547; 362/32

[56] References Cited

U.S. PATENT DOCUMENTS

| | | | |
|---|---|---|---|
| 3,832,029 | 8/1974 | Bryngdahl | 385/133 X |
| 4,087,159 | 5/1978 | Ulrich | 385/115 X |
| 4,294,815 | 10/1981 | Kaufman | 359/634 X |
| 4,730,882 | 3/1988 | Messerschmidt | 385/146 |
| 4,784,877 | 11/1988 | Trumble | 385/147 X |
| 4,805,984 | 2/1989 | Cobb, Jr. | 385/147 X |
| 4,826,274 | 5/1989 | Diamantstein et al. | 385/147 X |
| 4,866,694 | 9/1989 | Korth | 385/129 |
| 4,869,575 | 9/1989 | Kubik | 351/158 X |
| 4,991,935 | 2/1991 | Sakurai | 359/802 X |
| 5,050,946 | 9/1991 | Hathaway et al. | 385/33 |
| 5,106,181 | 4/1992 | Rockwell, III | 385/2 |
| 5,123,077 | 6/1992 | Endo et al. | 385/129 X |
| 5,165,005 | 11/1992 | Klainer et al. | 385/129 |
| 5,202,950 | 4/1993 | Arego et al. | 385/129 X |
| 5,208,891 | 5/1993 | Prysner | 385/116 |
| 5,244,198 | 6/1993 | Jachimowicz et al. | 385/133 |

*Primary Examiner*—Brian Healy

*Attorney, Agent, or Firm*—Eugene A. Parsons

[57] ABSTRACT

A compact array imager including image generation apparatus providing a real image at an inlet of an optical image waveguide. The real image being reflected a plurality of times within the optical image waveguide by diffractive optical elements that magnify and filter the real image and produce a virtual image at a viewing aperture The imager further includes electronics mounted on the sides of the optical image waveguide and coupled to the image generation apparatus by embedded molded signal waveguides for receiving signals representative of an image and controlling the apparatus to generate the image.

20 Claims, 4 Drawing Sheets

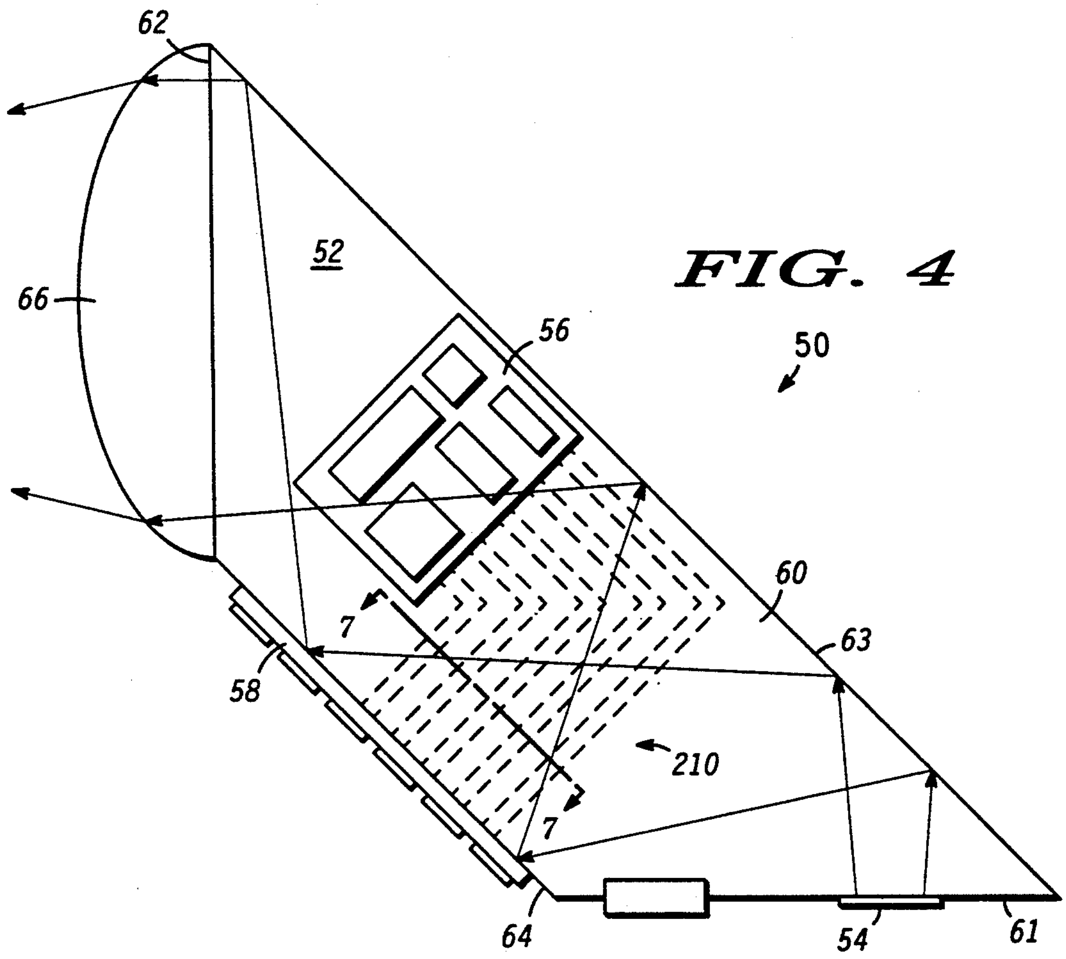
FIG. 4
FIG. 7
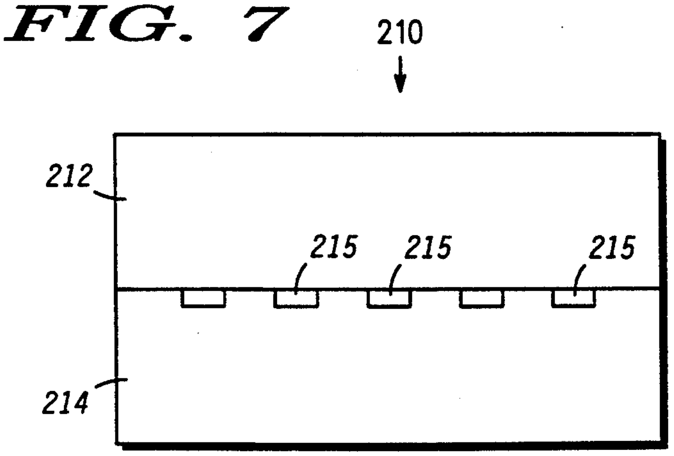

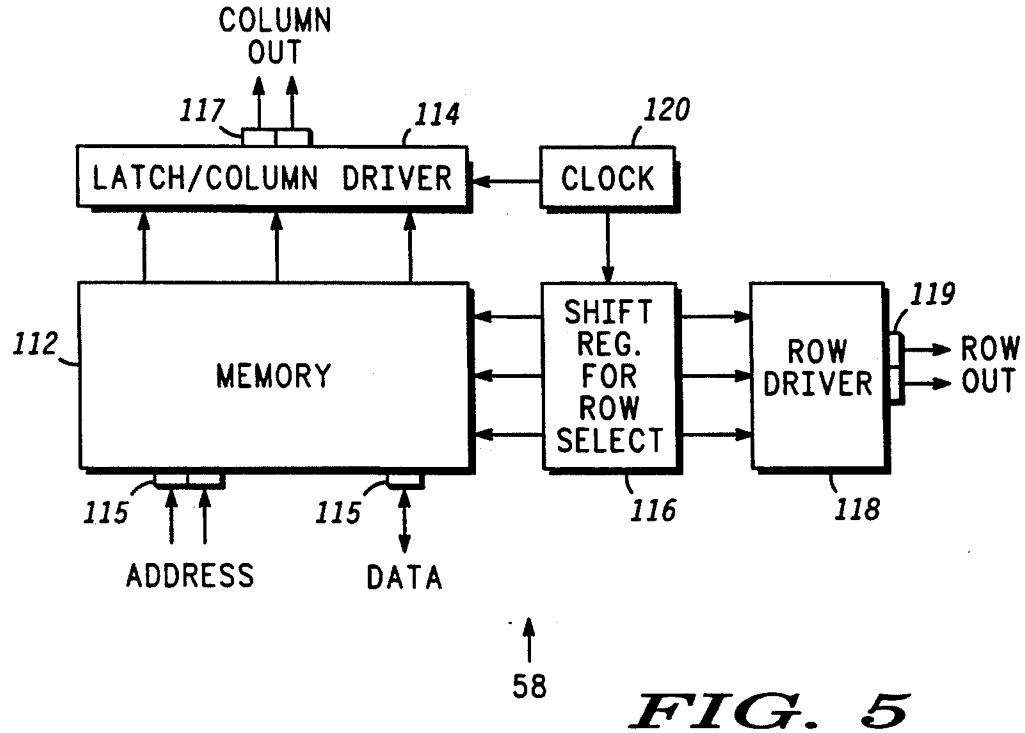
FIG. 5
FIG. 6
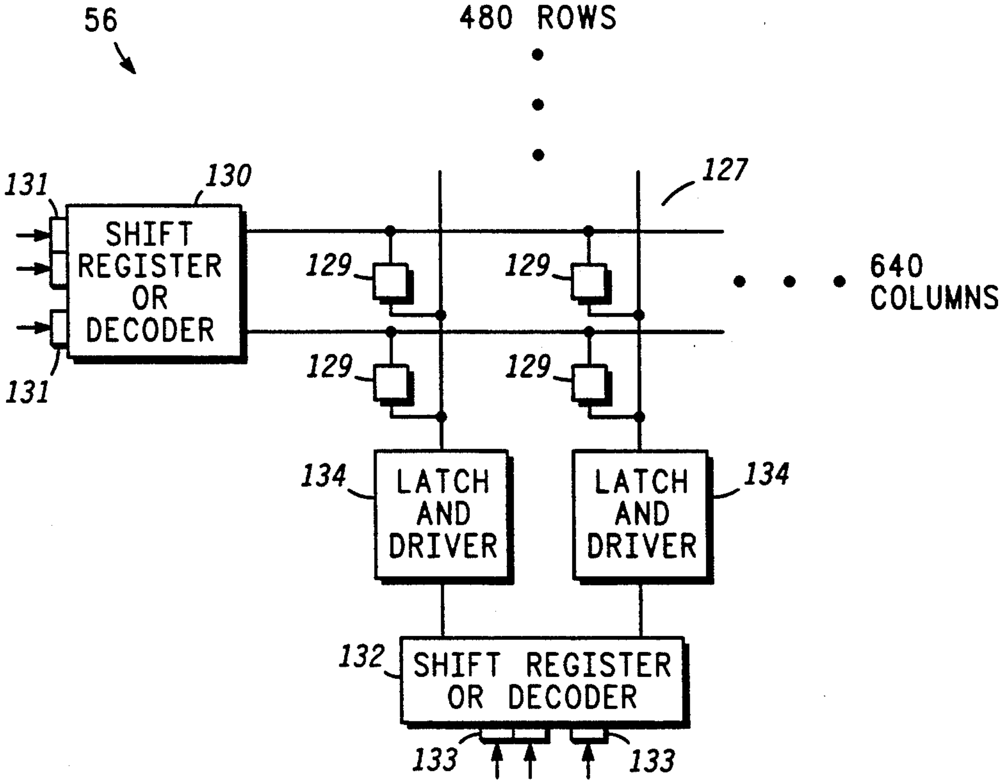

CONTACT ARRAY IMAGER WITH INTEGRAL WAVEGUIDE AND ELECTRONICS

The present invention pertains to virtual image displays and more particularly to compact virtual image displays and integral electronics for driving the displays.

BACKGROUND OF THE INVENTION

Visual displays are utilized in a great variety of equipment at the present time. The problem is that visual displays require a relatively large amount of electronic circuitry and high electrical power and require a great amount of area to be sufficiently large to produce a useful display. In the prior art, for example, it is common to provide visual displays utilizing liquid crystal displays, directly viewed light emitting diodes, etc. These produce very large and cumbersome displays that greatly increase the size of the receiver and require relatively large amounts of power.

In one instance, the prior art includes a scanning mirror which periodically scans a single row of pixels to produce a two dimensional visual display but again this requires relatively large amounts of power and is very complicated and sensitive to shock. Also, the scanning mirror causes vibration in the unit which substantially reduces visual acuity.

SUMMARY OF THE INVENTION

It is a purpose of the present invention to provide a new and improved compact array imager with integral driving electronics.

It is a further purpose of the present invention to provide a new and improved virtual image display and integral driving electronics which is a compact, self-contained unit with less expensive and more manufacturable packaging for both the optical and electronic functions.

These and other purposes and advantages are realized in a compact array imager having a viewing aperture, the imager including image generation apparatus for providing a real image, an optical image waveguide having an inlet positioned adjacent the apparatus for receiving a real image provided thereby and an outlet spaced from the inlet and defining the viewing aperture, the optical image waveguide defining an optical path therethrough from the inlet to the outlet and constructed to transmit an image from the inlet to the outlet with optical means positioned along the optical image waveguide at predetermined areas in the optical path for magnifying a real image supplied at the inlet and providing a magnified virtual image at the outlet, and electronics mounted on the optical image waveguide and coupled to the image generation apparatus for receiving input signals representative of a predetermined image and utilizing the input signals to control the image generation apparatus to produce the predetermined image.

BRIEF DESCRIPTION OF THE DRAWINGS

Referring to the drawings:

FIG. 4 is a side elevational view of a compact array imager with integral electronics embodying the present invention;

FIG. 5 is a simplified block diagram of driver circuitry for driving an array of light emitting devices;

FIG. 6 is a block diagram of control circuitry, portions thereof removed;

FIG. 7 is a sectional view of a portion of FIG. 4 as seen from the line 7—7.

DESCRIPTION OF THE PREFERRED EMBODIMENT

Figure 1:
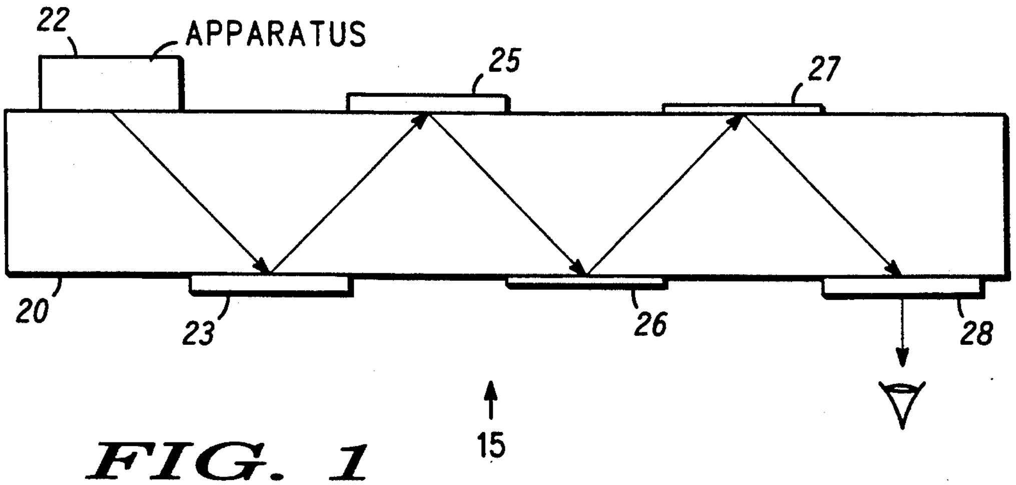
FIG. 1 is a view in side elevation of an array imager.

Referring specifically to FIG. 1, an array imager 15 is illustrated in a side elevational view. Imager 15 includes an optical image waveguide 20. The term "image waveguide" as used in this disclosure denotes total internal reflection confinement in a relatively thick substrate. This is opposed to the more conventional usage, herein referred to as "signal waveguide", in which light is confined to a very thin layer in which only discrete waveguide modes can propagate. Optical image waveguide 20 has image generation apparatus 22 affixed thereto adjacent one end for providing a real image at a real image inlet. The real image from apparatus 22 is directed angularly along optical waveguide 20 toward a diffractive lens 23. Diffractive lens 23 is any of the well known lenses, similar in operation to a Fresnel lens, which are presently producible. As is known in the art, diffractive lenses utilizing the Fresnel principal, binary optics, etc. are producible utilizing well known semiconductor manufacturing techniques. Such lenses are conveniently patterned to provide a desired amount of magnification and/or aberration correction.

Light rays from the real image at apparatus 22 are diffracted by lens 23 onto a second lens 25 where additional magnification and/or aberration correction occurs. The light rays are then directed along a light path through optical image waveguide 20, being reflected at predetermined areas 26 and 27, until the light rays exit optical image waveguide 20 at a virtual image outlet. Depending on the optical properties required of array imager 15, areas 26 and/or 27 may include additional diffractive optical elements, providing additional optical power, filtering, aberration correction, etc. Diffractive grating 28 defines a viewing aperture, through which an operator looks to view an enlarged virtual image of the real image produced by apparatus 22.

Figure 2:
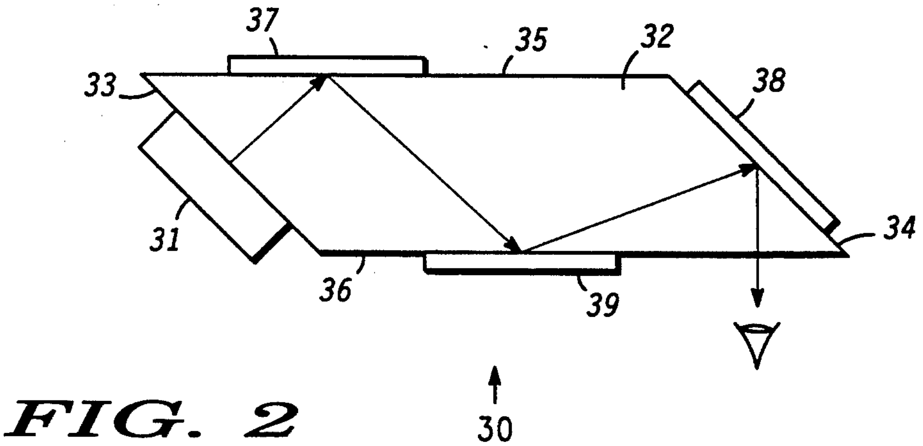
FIGS. 2 and 3 are side elevational views of other array imagers.

Referring specifically to FIG. 2, another embodiment of an array imager 30 is illustrated wherein apparatus 31 is affixed to the inlet of an image waveguide 32 for providing a real image thereto. Image waveguide 32 is formed generally in the shape of a parallelogram (side view) with opposite sides, 33, 34 and 35, 36, equal and parallel but not perpendicular to adjacent sides. Side 33 defines the inlet and directs light rays from the real image at apparatus 31 onto a predetermined area on adjacent side 35 generally along an optical path defined by all four sides. Three diffractive lenses 37, 38 and 39 are affixed to adjacent sides 35, 34 and 36, respectively, at three predetermined areas and the magnified virtual image is viewable at an outlet in side 36. This particular embodiment illustrates a display in which the overall size is reduced somewhat and the amount of material in the image waveguide is reduced to reduce weight and material utilized.

Figure 3:
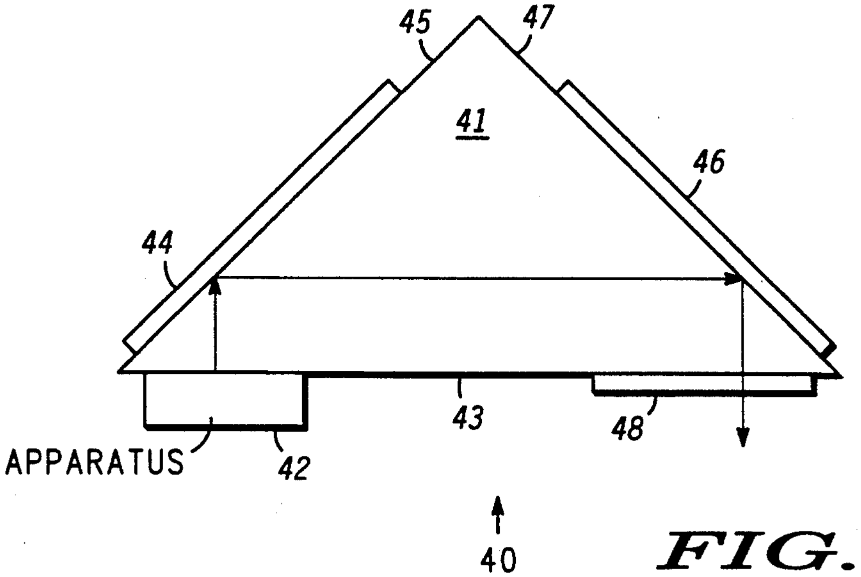

Referring to FIG. 3, yet another embodiment of an array imager 40 is illustrated wherein an optical image waveguide 41 having a generally triangular shape in side elevation is utilized. An apparatus 42 for producing a real image is affixed to a first side 43 of optical image waveguide 41 and emanates light rays which travel along an optical path directly to a diffractive lens 44 affixed to a second side 45. Light rays are reflected from lens 44 to a diffractive lens 46 mounted on a third side 47. Lens 46 in turn reflects the light rays through a final diffractive lens 48 affixed to the outlet of optical image waveguide 41 in side 43, which lens 48 defines a viewing aperture for imager 40. In this particular embodiment the sides are angularly positioned relative to each other so that the inlet and outlet to imager 40 are perpendicular.

FIG. 4 is a side elevational view of a compact array imager 50 with integral electronics embodying the present invention. Imager 50 includes an optical image waveguide 52 and image generating apparatus affixed thereto. The image generating apparatus includes and array 54 of light emitting elements forming pixels which are arranged into rows and columns. Array 54 is attached to control circuitry 56 which is in turn attached to driver circuitry 58. Control circuitry 56 is illustrated in more detail in FIG. 6 and will be described fully in conjunction therewith. Driver circuitry 58 is illustrated in more detail in FIG. 5 and will be described in more detail in conjunction therewith.

In this specific embodiment image waveguide 52 is formed with six faces. Face 60 forms the side lying in the plane of FIG. 4 and is generally shaped like a truncated triangle. The opposite face, not visible, is a mirror image of face 60 lying in a plane parallel to the plane of FIG. 4 and spaced into the paper therefrom. Faces 61, 62, 63 and 64 are generally rectangularly shaped with face 61 defining an optical input and face 62, lying in a plane perpendicular to the plane of face 61, defining an optical output.

Array 54 is mounted on face 61 and provides a real image at face 61. Broken lined arrows generally indicate the path of light passing through image waveguide 52 from array 54. The light rays from array 54 are reflected by face 63 toward face 64 where they are reflected again toward a different area of face 63. Face 63 finally reflects the light rays perpendicularly onto face 62 so that the light emerges from image waveguide 52 through a viewing lens 66. Lens 66 provides any focusing, additional magnification, etc. that may be needed for an operator to easily view the image generated by array 54. Further, as described previously with reference to FIGS. 1-3, the various internal reflecting areas of image waveguide 52 may include additional diffractive optical elements, affixed to the external surface or molded into image waveguide 52, providing additional optical power, filtering, aberration correction, etc. In this specific embodiment face 63 includes two magnifying lenses, molded into image waveguide 52 at the two different reflecting areas, to provide the desired amount of magnification and the rear surface of driver circuitry 58 is mirrored, using either a metallic reflector (e.g. gold, aluminum, chrome, etc.) or deposited multilayer dielectric layers of alternating refractive index material (e.g. Si and $SiO_2$) to provide good reflection and low light loss.

It will of course be understood that optical image waveguide 52 and other optical image waveguides disclosed herein are constructed of optical quality quartz, optical quality plastic, or any other of the materials well known and available for the purpose. Further, the various lenses and diffraction gratings described herein are manufactured individually and attached to the image waveguide surface, manufactured integrally with the image waveguide in a single piece, or some preferred combination of the two. For example, the image waveguide can be formed by molding the body out of optical quality plastic and the various diffractive optical elements can be made by embossing a master into a soft polymer film which is then attached to the surface of the optical image waveguide. Alternatively, the surface of an optical image waveguide formed of optical quality quartz can be processed (etched, deposits, etc) by known semiconductor techniques to provide the desired diffraction and/or reflection characteristics.

Referring specifically to FIG. 5, driver circuitry 58 is illustrated in a simplified block diagram. Circuitry 58 includes a memory 112, column output circuitry 114, row selection circuitry 116, row driver circuitry 118 and a clock 120. In this embodiment, circuitry 58 includes a plurality of semiconductor chips mounted in a multi-chip module, as illustrated generally in FIG. 4. Memory 112 is, for example, any of the electronic memories available on the market including but not limited to ROMs, PROMs, EPROMs, EEPROMs, RAMs etc. Driver circuitry 58 is designed to operate with a specific array of light emitting elements, which in the case of array 54 are LEDs. LEDs are believed to be especially useful in portable communications equipment and the like because of the extremely low power requirements. In this specific embodiment LED array 54 is utilized because of the extremely small size that can be achieved and because of the simplicity of construction and operation. It will of course be understood that other light emitting elements may be utilized, including but not limited to lasers, superluminescent surface light emitting devices, LCDs, CRTs, etc. Additional information on superluminescent devices is available in a copending application entitled "Superluminescent Surface Light Emitting Device", Ser. No. 07/770,841, filed 4 Oct. 1991, pending, and assigned to the same assignee. Each pixel includes at least one LED, with additional parallel LEDs being included, if desired, for additional brightness and redundancy.

It will be understood by those skilled in the art that LED array 54 is greatly enlarged in FIG. 4. The actual size of array 54 is on the order of a few milli-meters along each side with each LED being on the order of as little as one micron on a side. As the semiconductor technology reduces the size of the chip, greater magnification and smaller lens systems are required. Because the long optical path (multiple reflections) in optical image waveguide 52 allows for greatly increased focal lengths of the diffractive elements or lenses without substantially increasing the overall size of the display, relatively high magnification can be achieved without greatly limiting the field of view or substantially reducing eye relief. In fact, with the eye positioned approximately one inch from the surface of lens 66, the image appears to the viewer to be approximately 15 inches behind imager 50 and approximately 1.3 inches high by 3.2 inches wide.

Image information is supplied to memory 112 by way of the data input and is stored in a predetermined location by means of an address supplied to the address input. In this embodiment, the data is communicated by means of molded optical signal waveguides (to be described presently) to light detectors 115, which convert light rays to electrical signals. The stored data is supplied to the display a complete row at a time by way of latch/column driver 114. Each bit of data for each column in the row is accessed in memory 112 and transferred to a latch circuit. The data may simply be sampled, actually removed from the memory and the memory refreshed, or new data introduced, while the current data is latched into the latch circuit. The current data is then supplied to the column drivers, by means of light emitting devices 117 (e.g. LED's, lasers, etc.) and molded optical signal waveguides, to drive each pixel in the row simultaneously. At the same time, shift register 116 is sequentially selecting a new row of data, by means of light emitting devices 119 (e.g. LED's, lasers, etc.) and molded optical signal waveguides, each time a pulse is received from clock 120. The newly selected row of pixels is actuated by row drivers 118 so that data supplied to the same pixels by latch/column drivers 114 causes the pixel to emit the required amount of light.

Referring to FIG. 6, a block diagram of control circuitry 56 constructed in accordance with the present invention, portions thereof removed, is illustrated. Control circuitry 56 includes an image generator 127 with a plurality of pixels 129 each having at least one light emitting element, with the pixels being connected in a matrix of rows and columns. In this particular embodiment the rows contain 640 pixels and the columns contain 480 pixels, which in this embodiment is a complete page (image). It will of course be understood that any desired number of rows and columns can be utilized for specific applications, however, because of the extreme small size of the present structure more pixels and better resolution (e.g. 1000×1000) can relatively easily be incorporated. Control circuitry 56 further includes driver circuitry 58 from FIG. 5. As illustrated in FIG. 6, a shift register or decoder 130 is connected to the row inputs of image generator 127 and a shift register or decoder 132 is connected through a plurality of latch and driver circuits 134 to the column inputs of image generator 127. Data is supplied to shift register or decoder 130 and 132 by means of light detectors 131 and 133, respectively, and molded optical signal waveguides (to be explained presently). Shift register or decoder 130 may be, for example, shift register 116 and row driver 118 of FIG. 5. Shift register or decoder 132 is, for example, memory 112 of FIG. 5. In this configuration with pixels 129 including LEDs, one terminal of each LED is connected to the row lines and the other terminal of each LED is connected to the column lines. Further, in the full implementation illustrated, there are 480 rows and 640 columns for a total of 307,200 pixels in a complete page or image.

In the operation of control circuitry 56, one row of display data is loaded into latch and driver circuits 134 associated with each of the column lines. Once this has been accomplished, a row is selected and energized by shift register or decoder 130, illuminating the appropriate pixels 129 according to the data stored in latch and driver circuits 134. While the selected row is being energized, the display data corresponding to the next row in the sequence is loaded into latch and driver circuits 134 and the procedure is repeated. Assuming a repetition rate of 60 frames per second, each row is illuminated for approximately 35 microseconds.

There are two basic approaches for energizing the appropriate row and for transferring data to the appropriate columns. One approach uses decoders while the other approach uses shift registers. In the decoder approach, each row or column is individually addressed. The number of rows in control circuitry 56, for example, requires a 9 bit address while the number of columns requires a 10 bit address. The circuitry required to sequence through the addresses is well understood by those skilled in the art and is not included herein for simplicity. The shift register approach takes advantage of the fact that random access to the rows and columns is not generally required in matrix displays, they need only be addressed sequentially. The advantage to the shift register approach is that it only requires a clock and a pulse to initiate a new row sequence. Both approaches are believed to have applications in array imagers for portable electronic equipment and the like.

It should also be noted that the array imager can be a simple monochrome configuration, a display utilizing monochrome grayscale, or color. For a simple monochrome imager, only a one bit digital signal is needed for each pixel, as the pixel is either on or off. For an imager utilizing a monochrome grayscale, either an analog signal or a multi-bit digital signal is required. A sixteen level grayscale, for example, needs a four bit digital signal. Full color, generally requires at least three light emitting elements per pixel, one for each of the basic colors (red, green and blue), and a type of grayscale signal system to achieve the appropriate amount of each color.

At a position in image waveguide 52 in which light transmission does not occur, a depression 150 is provided for receiving a power source, such as a battery or the like. By providing depression 150 at a portion of image waveguide 52 which does no conduct light, there is less wasted space and the overall size of array imager 50 is reduced even further.

Interconnections between control circuitry 56, driver circuitry 58 and array 54, in this specific embodiment are made by molded signal waveguides 210 which are embedded in image waveguide 52. While a specific division of components of array imager 50 have been disclosed, it should be noted that electrical/optical/electrical communications paths can be utilized at any convenient interfaces. As defined earlier, molded signal waveguides 210 are the more conventional waveguide in which light is confined to a very thin layer in which only discrete waveguide modes can propagate. Light transmitters and receivers 115, 117, 131 and 133, which may be for example lasers and diode detectors, are mounted on control circuitry 56, driver circuitry 58 and array 54 to convert the electrical signals to light and to convert light signals to electrical signals. Some hard wiring in the form of copper lead frames molded with the cladding material of the molded optical signal waveguides is, or can be, utilized for power connections and the like. While it should be understood that conventional electrical hard wiring could be utilized, molded signal waveguides are used in this embodiment because of the large amount of data that can be transmitted through a single waveguide.

FIG. 7 is a sectional view of embedded molded optical signal waveguides 210 as seen from the line 7—7 in FIG. 4. Molded signal waveguides 210 are molded directly into, and simultaneously with, image waveguide 52, in this specific embodiment. However, for a complete understanding of the technique for molding signal waveguides 210 the description which follows illustrates the application in which signal waveguides 210 are molded separately and attached after the formation of image waveguide 52. Molded signal waveguides 210 are made of first cladding layer 212, second cladding layer 214, and cores 215. Second cladding layer 214 is molded with axially extending channels in the inner surface thereof, which channels are designed to receive unprocessed core material therein. Typically, the inner surfaces of molded first cladding layer 212 and molded second cladding layer 214 are joined by an optically transparent material which forms cores 215 of signal waveguides 210 and acts as an adhesive and an optically transparent polymer. The optically transparent material generally may be any of several materials, such as epoxies, plastics, polyimides, or the like. Generally, refractive indexes of these optically transparent materials range from 1.54 to 1.58. It should be understood that to form an optical signal waveguide of this type the refractive index of cores 215 should be at least 0.01 greater than the refractive index of cladding layers 212 and 214.

In this specific embodiment of molded signal waveguides 210, epoxy is used to join the inner surface of first cladding layer 212 to the inner surface of second cladding layer 214. Application of the epoxy is done in a manner so as to completely fill the channels of first cladding layer 212, thereby forming cores 215. Further, by having cores 215 completely surrounded by cladding layers 212 and 214, cores 215 have superior performance characteristics for conducting light or light signals. These superior performance characteristics are used in enhancing high speed communications applications, such as chip-to-chip communications, board-to-chip communications, board-to-board communications, computer-to-computer communications, and the like. Additionally, a capability is available, in molded signal waveguides 210, to match refractive indexes of cladding layers 212 and 214.

Typically, the epoxy may be cured by a variety of methods, such as air drying, exposure to UV light, heat treating, or the like. Selection of specific curing methods is application specific as well as being dependent upon selection of the adhesive and the cladding materials that are used for making first and second cladding layers 212 and 214.

By way of example only, first cladding layer 212 and second cladding layer 214 are made by injecting a transparent epoxy molding compound, available under the Tradename HYSOL MG18 from Dexter Corporation, into molds (not shown) provided for the purpose. Temperature of the molds range between 150° C. to 175° C. with a preferred temperature range from 160 degrees Celsius to 165 degrees Celsius. Molding pressure of the molds range between 500 psi to 1,000 psi with a preferred pressure range from 750 pounds per square inch to 800 pounds per square inch. Typically, transfer time ranges from 30 to 50 seconds at a temperature of 150° C. to 20 to 30 seconds at a temperature of 175° C. Curing time typically ranges from 3 to 5 minutes at 150° C. to 2 to 4 minutes at a temperature of 175° C. Upon completion of the curing time, first cladding layer 212 and second cladding layer 214 are removed from the molds. Typically, a post-curing step is necessary in order to achieve maximum physical and electrical properties of the HYSOL material. This step generally proceeds at 150 degrees Celsius for approximately 2 to 4 hours. Completion of the post-cure step results in first cladding layer 212 and second cladding layer 214 having a refractive index of approximately 1.52.

Once the molding and curing processes, as well as the removal of the first and second cladding layers 212 and 214 from their respective molds have been completed, the first and second cladding layers 212 and 214 are ready to be assembled. Assembly is achieved by applying, to the inner surface of one of the cladding layers, an optically clear adhesive with a refractive index at least 0.01 higher than the material forming the first and second cladding layers 212 and 214. In this specific embodiment, this is accomplished by applying an optically clear epoxy available under a Tradename EPO-TEK 301-2 from EPOXY TECHNOLOGY INC. Typically, after the adhesive is applied to the inner surface of first cladding layer 212, the inner surface of second cladding layer 214 is compressed against the inner surface of first cladding layer 212, thereby squeezing and filling the channels and adhering both first cladding layer 212 and second cladding layer 214 together. Curing times for the adhesive epoxy is dependent upon temperature, e.g., at room temperature curing time is 2 days and at 80 degrees Celsius curing time is 1.5 hours.

Figure 8:
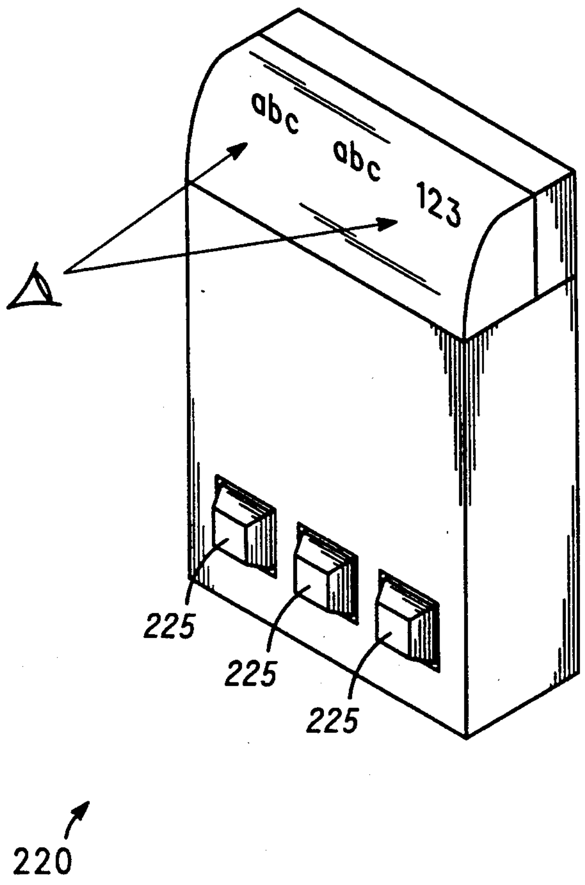
FIG. 8 is a view in perspective of a portable electronic device incorporating the compact array imager with integral electronics of FIG. 4.

FIG. 8 illustrates array imager 50 of FIG. 4 mounted in a portable electronic device, which in this specific example is a pager 220. Lens 66 of array imager 50 forms the curved surface of pager 220 and a plurality of controls 225 on the front surface of pager 220 are easily operated while viewing the transmitted message. Electronics, including a communications transmitter and/or a receiver are included in the housing of pager 220 and, in fact, most of the electronics (if not all) are located on the substrate for driver circuitry 58 and/or control circuitry 56. The RF operation of the transmitter/-receiver is the same as in other general applications and, therefore, is not described in detail herein. Array imager 50, as disclosed, is fully operable to receive and generate complete images including alpha-numerics and or pictorial presentations. Further, array imager 50 is very small and consumes relatively little power. While a plurality of different embodiments have been illustrated and explained, it will be understood that any single embodiment can incorporate any or all of the described features. Generally, each specific embodiment should be tailored to whatever application it is desired to provide and whichever features are required should be incorporated.

Thus a new and greatly improved array imager is disclosed, which is used with an extremely small LED array or other real image apparatus. The array imager provides a predetermined amount of magnification without reducing the eye relief or the working distance of the lens system. Further, the electronics provided as an integral portion of the array imager allows a variety of very small real images to be generated, which can be easily and comfortably viewed by an operator. The disclosed array imager is especially useful in small portable electronic devices such as pagers, palm-top computers, portable two-way radios, portable telephones, etc.

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

What is claimed is:

1. A compact array imager having a viewing aperture, the imager comprising:

image generation apparatus including a semiconductor device array formed on a single semiconductor chip and defining a plurality of rows and columns of pixels for providing a real image;

an optical image waveguide having an inlet positioned adjacent the apparatus for receiving a real image provided thereby and an outlet spaced from the inlet and defining the viewing aperture, the optical image waveguide defining an optical path therethrough from the inlet to the outlet and constructed to transmit an image from the inlet to the outlet with optical means positioned along the optical image waveguide at predetermined areas in the optical path for magnifying a real image supplied at the inlet and providing a magnified virtual image at the outlet which is easily perceived by an operator; and electronics mounted on the optical image waveguide and coupled to the image generation apparatus for receiving input signals representative of a predetermined image and utilizing the input signals to control the image generation apparatus to produce the predetermined image.

2. A compact array imager as claimed in claim 1 wherein the electronics is coupled to the image generation apparatus by a molded signal waveguide.

3. A compact array imager as claimed in claim 2 wherein the electronics includes driver and control circuitry for the image generation apparatus.

4. A compact array imager as claimed in claim 2 wherein the optical means includes a diffractive optical element formed of a soft photopolymer film positioned at a surface of the optical image waveguide.

5. A compact array imager as claimed in claim 1 wherein the optical image waveguide is formed of optical quality quartz glass.

6. A compact array imager as claimed in claim 1 wherein the optical means includes a diffractive optical element.

7. A compact array imager as claimed in claim 6 wherein the diffractive optical element includes a diffractive lens.

8. A compact array imager as claimed in claim 6 wherein the diffractive optical element includes a diffractive filter.

9. A compact array imager as claimed in claim 1 wherein the apparatus providing the real image is formed in a semiconductor chip.

10. An array imager as claimed in claim 9 wherein the apparatus providing the real image includes a light emitting diode array.

11. A compact array imager as claimed in claim 1 wherein the electronics includes a communications receiver.

12. A compact array imager as claimed in claim 11 wherein the communications receiver is included as a portion of a pager.

13. A compact array imager having a viewing aperture, the imager comprising:

image generation apparatus including a semiconductor device array formed on a single semiconductor chip and defining a plurality of rows and columns of pixels for providing a real image;

an optical image waveguide having a real image inlet positioned adjacent the image generation apparatus for receiving a real image provided by the image generation apparatus and a virtual image outlet spaced from the real image inlet and defining the viewing aperture, the optical image waveguide including a plurality of sides with the inlet positioned to direct incoming light waves angularly toward a first of the plurality of sides, resulting in a plurality of reflections between the plurality of sides, and defining an optical path through the optical image waveguide from the real image inlet to the virtual image outlet, the reflections defining predetermined areas along the image waveguide with optical means positioned along the optical image waveguide at at least some of the predetermined areas in the optical path for magnifying a real image supplied at the real image inlet and providing a magnified virtual image at the virtual image outlet which is easily perceived by an operator; and electronics mounted on the optical image waveguide and coupled to the image generation apparatus for receiving input signals representative of a predetermined image and utilizing the input signals to control the image generation apparatus to produce the predetermined image, the electronics being constructed to sequentially energize each of the plurality of rows of pixels, one row at a time, until all of the pixels in each of the plurality of columns is energized and a complete real image is generated.

14. A compact array imager as claimed in claim 13 wherein the optical means includes a plurality of diffractive optical elements.

15. A compact array imager as claimed in claim 13 wherein the plurality of diffractive optical elements includes diffractive lenses.

16. A compact array imager as claimed in claim 13 including in addition a battery positioned in a depression in the optical image waveguide.

17. A compact array imager as claimed in claim 13 wherein the electronics is coupled to the image generation apparatus by a molded signal waveguide.

18. A compact array imager as claimed in claim 17 wherein the molded signal waveguide coupling the electronics to the image generation apparatus is molded as an integral portion of the optical image waveguide.

19. A compact array imager as claimed in claim 1 wherein the semiconductor chip is constructed with a size less than a few millimeters on a side with each semiconductor device in the semiconductor device array being constructed with a size on the order of as little as one micron on a side.

20. A compact array imager as claimed in claim 13 wherein the semiconductor chip is constructed with a size less than a few millimeters on a side with each semiconductor device in the semiconductor device array being constructed with a size on the order of as little as one micron on a side.

* * * * *